No. 792,561.                                    Patented June 13, 1905.

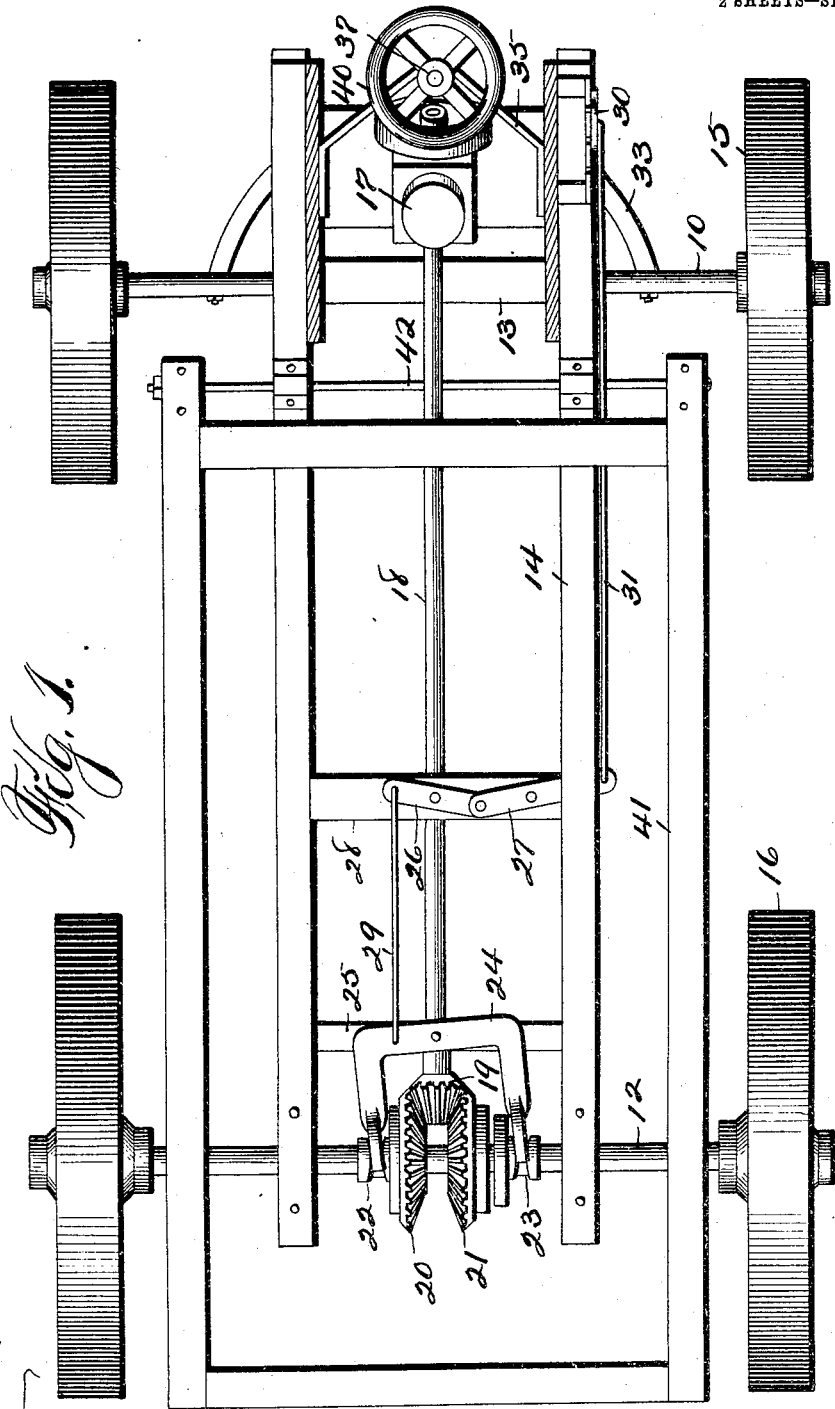

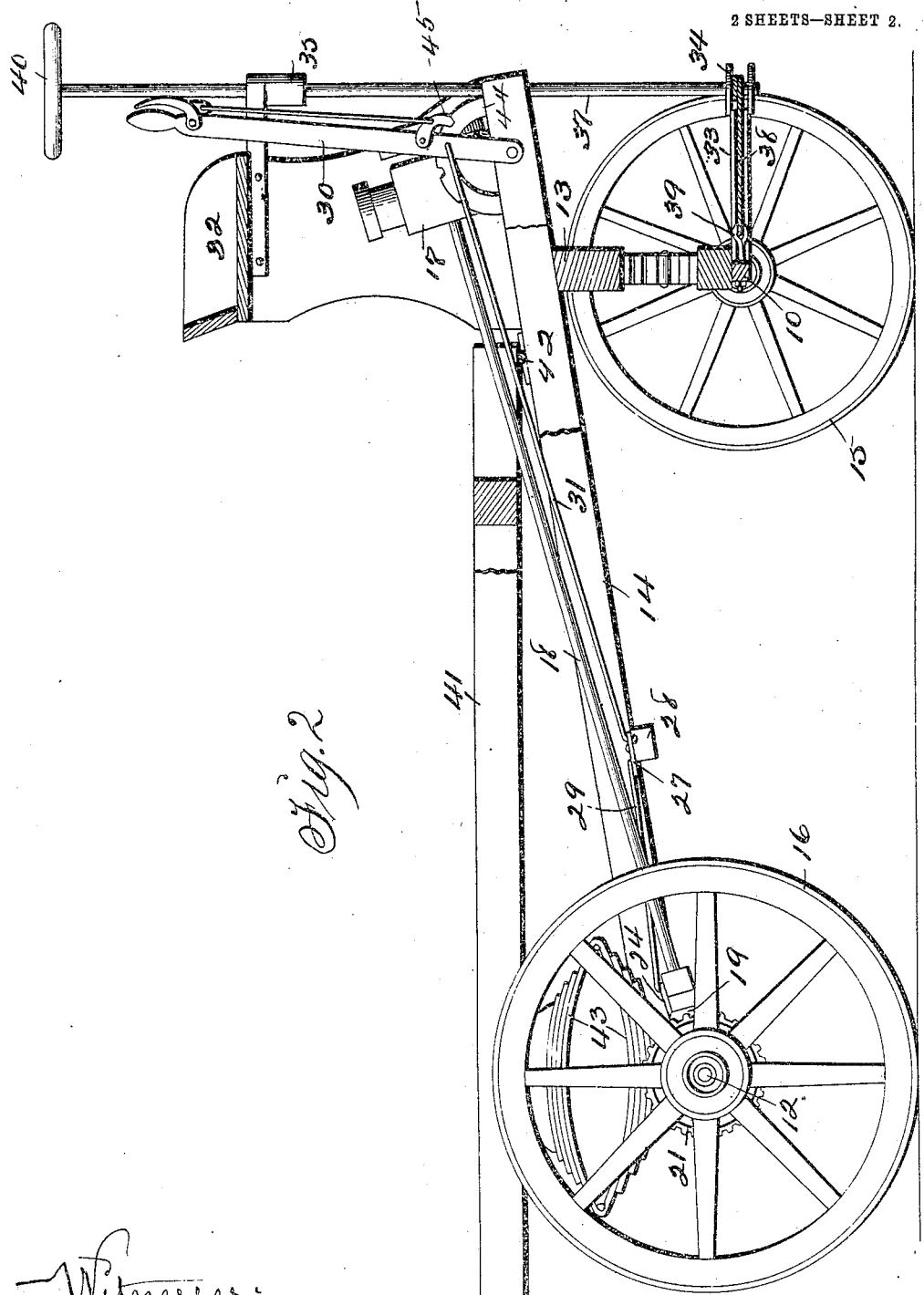

UNITED STATES PATENT OFFICE.

WILLIAM G. THOMPSON, OF DES MOINES, IOWA.

AUTOMOBILE DRAY.

SPECIFICATION forming part of Letters Patent No. 792,561, dated June 13, 1905.

Application filed March 22, 1905. Serial No. 252,093.

*To all whom it may concern:*

Be it known that I, WILLIAM G. THOMPSON, a citizen of the United States, residing at Des Moines, in the county of Polk and State of Iowa, have invented a new and useful Automobile Dray, of which the following is a specification.

My object is to provide an automobile dray specially adapted for carrying merchandise and freight of different kinds.

My invention consists, first, in hinging a platform to the front end portion of a four-wheeled truck, connecting a spring with the front axle to support the front end of the truck-frame and springs to the rear end of the truck-frame to support the rear end of the platform in such a manner that the front end of the truck-frame and the front end of the hinged platform will move up and down jointly relative to the front axle and the rear end of the platform will move up and down relative to the rear axle as required to keep the platform level when loaded with freight; second, in mounting a gasolene-engine or other suitable motor and a driver's seat on the front end of the truck-frame and connecting the motor-shaft with gearing on the rear axle in such a manner that the operator on the driver's seat can, by means of a lever at his side, reverse the motion of the truck as required to move forward or backward at his pleasure; third, in a steering mechanism connected with the front axle and the driver's seat in such a manner that the operator on the seat can readily control the forward and also the rearward movements of the dray.

Figure 1 of the drawings is a top view that shows the forms and positions of the different operative mechanisms relative to each other and the truck-frame, the hinged platform-frame, and the front and rear axles. Fig. 2 is a side elevation of the dray, partly in section, and shows all the parts combined as required for practical use.

The numeral 10 designates the front axle, 12 is the rear axle, 13 is a spring-actuated bolster on the front axle, and 14 is a truck-frame pivotally connected with the rear axle and fixed on the bolster at its front end portion in any suitable way in such a manner that the front end of the frame will be allowed an up-and-down vibratory motion when the dray is loaded and advanced over an uneven surface. The front axle is mounted on wheels 15 and the rear axle on wheels 16.

A gasolene-engine or other suitable motor 17 is fixed on the front end of the truck-frame 14 and its driver-shaft 18 inclined downward and rearward, and a bevel gear-wheel 19 is fixed to its end to engage bevel-gears 20 and 21, loosely mounted on the rear axle. Clutches 22 and 23, slidably mounted on the axle, can be simultaneously moved in opposite directions by means of a three-sided frame 24, pivoted on a cross-piece 25 of the truck-frame 14, as shown in Fig. 1, or in any suitable way.

Levers 26 and 27 are pivotally connected at their inner ends and pivoted on a cross-piece 28 of the truck-frame and the end of the lever 26 connected with the pivoted frame 24 by a link 29, and the lever 27 is connected with a hand-lever 30, pivoted to the side and front end of the truck-frame 14 by a rod 31, as shown in Fig. 2, in such a manner that a driver on the seat 32, fixed on top of the front end of the truck-frame, can readily therewith adjust the clutches 22 and 23 as required to reverse the movement of the dray.

To steer the movement forward or backward, a semicircular tubular frame 33 is fixed to the front axle 10 in any suitable way to project forward, and bearings 34, fixed to its front and center to aid a bearer 35, fixed to the seat 32, as shown in Fig. 2, to support a rotatable shaft 37. A cable 38 is fixed to the axle 10 by means of eyebolts 39 or in any suitable way and the ends of the cable fastened thereto and the center of the cable coiled around the shaft in such a manner that when the shaft is turned by means of a hand-wheel 40, fixed to its top, the direction of the dray will also be turned relative to a straight line to the right or left at the will of the operator.

A platform-frame 41 is adapted to be covered with a fixed floor and is hinged at its front end to the truck-frame by means of a metal shaft 42 in bearings fixed on top of the parallel sides of the truck-frame 14 and to the under side of the parallel sides of the platform-frame, as shown in Fig. 1, or in any suitable way as required to produce a pivotal connection between the two frames, and the rear end of the platform-frame is fixed to springs 43, that are fixed on the rear axle 12.

It is obvious the dray may vary in size as desired for the various kinds of freight that are to be carried thereon.

A rack 44 is fixed to the front of the truck-frame and a pawl 45 pivoted to the hand-lever 30 to engage the rack as required to lock the levers 26, 27, and 30 in fixed positions.

Having thus set forth the purpose of my invention and the construction, function, and arrangement and combination of all the parts, the practical operation and utility thereof will be readily understood by draymen and others familiar with the art to which it pertains.

What I claim as new, and desire to secure by Letters Patent, is—

1. In a dray, a truck composed of a front axle and a rear axle mounted on wheels, a truck-frame fixed to the rear axle and to the spring-actuated bolster on the front axle, two bevel gear-wheels fixed on the rear axle, a motor on the front end of the truck-frame, a rotatable driver-shaft extended from the motor and provided with a bevel gear-wheel on its end to engage the two bevel gear-wheels on the rear axle, clutches slidingly mounted on the rear axle and a three-sided frame pivoted to the truck-frame and connected with the clutches, to simultaneously slide the clutches and means to vibrate the three-sided frame, arranged and combined to operate in the manner set forth for the purposes stated.

2. In a dray, a truck composed of a front axle and a rear axle mounted on wheels, a truck-frame fixed to the rear axle and to the spring-actuated bolster on the front axle, two bevel gear-wheels fixed on the rear axle, a motor on the front end of the truck-frame, a rotatable driver-shaft extended from the motor and provided with a bevel gear-wheel on its end to engage the two bevel gear-wheels on the rear axle, clutches slidingly mounted on the rear axle and a three-sided frame pivoted to the truck-frame and connected with the clutches to simultaneously slide the clutches, two levers pivotally connected and each one pivoted to the truck-frame, the inner one pivotally connected with the three-sided frame, a hand-lever pivoted to the front of the truck-frame and a rod connected with its lower end and with the outer end of the outer lever and means to vibrate the three-sided frame, arranged and combined to operate in the manner set forth, for the purposes stated.

3. In a dray, a truck composed of a front axle and a rear axle mounted on wheels, a truck-frame fixed to the rear axle and to the spring-actuated bolster on the front axle, two bevel gear-wheels fixed on the rear axle, a motor on the front end of the truck-frame, a rotatable driver-shaft extended from the motor and provided with a bevel gear-wheel on its end to engage the two bevel gear-wheels on the rear axle, clutches slidingly mounted on the rear axle and a three-sided frame pivoted to the truck-frame and connected with the clutches to simultaneously slide the clutches, two levers pivotally connected and each one pivoted to the truck-frame, the inner one pivotally connected with the three-sided frame, a hand-lever pivoted to the front of the truck-frame and a rod connected with its lower end and with the outer end of the outer lever and means to vibrate the three-sided frame, and means to retain the levers stationary, arranged and combined to operate in the manner set forth for the purposes stated.

4. In a dray, a truck composed of a front axle and a rear axle mounted on wheels, a truck-frame fixed to the rear axle and to the spring-actuated bolster on the front axle, two bevel gear-wheels fixed on the rear axle, a motor on the front end of the truck-frame, a rotatable driver-shaft extended from the motor and provided with a bevel gear-wheel on its end to engage the two bevel gear-wheels on the rear axle, clutches slidingly mounted on the rear axle and means to simultaneously slide the clutches, a semicircular frame fixed to the front-axle shaft, bearings at the front and center of said frame, a cable fixed to the axle and coiled around said shaft and means for supporting the shaft upright and to rotate it, arranged and combined to operate in the manner set forth, for the purposes stated.

5. In a dray, a truck composed of a front axle and a rear axle mounted on wheels, a truck-frame fixed to the rear axle and to the spring-actuated bolster on the front axle, two bevel gear-wheels fixed on the rear axle, a motor on the front end of the truck-frame, a rotatable driver-shaft extended from the motor and provided with a bevel gear-wheel on its end to engage the two bevel gear-wheels on the rear axle, clutches slidingly mounted on the rear axle and means to simultaneously slide the clutches, a seat fixed on the front of the truck-frame and a bearer fixed to the seat to support a rotatable shaft, arranged and combined to operate in the manner set forth, for the purposes stated.

WILLIAM G. THOMPSON.

Witnesses:
L. L. LEIBROCK,
THOMAS G. ORWIG.